(12) United States Patent
Monnig

(10) Patent No.: US 12,189,689 B1
(45) Date of Patent: Jan. 7, 2025

(54) TEMPORAL IDENTITY GRAPH

(71) Applicant: EQUIFAX INC., Atlanta, GA (US)

(72) Inventor: Nathan Daniel Monnig, Boise, ID (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 18/470,150

(22) Filed: Sep. 19, 2023

(51) Int. Cl.
*G06F 16/90* (2019.01)
*G06F 16/901* (2019.01)
*G06F 16/904* (2019.01)

(52) U.S. Cl.
CPC ........ *G06F 16/9024* (2019.01); *G06F 16/904* (2019.01)

(58) Field of Classification Search
CPC ............................ G06F 16/9024; G06F 16/904
See application file for complete search history.

(56) References Cited

U.S. PATENT DOCUMENTS

2005/0188294 A1* 8/2005 Kuchinsky ............. G16B 45/00
715/201
2020/0364366 A1* 11/2020 Kundu .................. H04L 63/102

\* cited by examiner

*Primary Examiner* — Baoquoc N To
(74) *Attorney, Agent, or Firm* — Kilpatrick Townsend & Stockton LLP

(57) ABSTRACT

A system can generate an identity graph that can be arranged temporally for use at least in risk assessment operations and similar analyses. The system can receive a request to visualize entity data. The system can receive the entity data, which can include a set of identity data and a set of interaction data. The system can generate a temporal identity graph using the entity data. The temporal identity graph can temporally link the identity of the entity with the interactions associated with the entity. The system can generate a graphical user interface that may be configured to provide the temporal identity graph in response to the request to visualize the entity data. The graphical user interface can include interactive elements representing the temporal identity graph. Each interactive element can be selected by a user of the graphical user interface to display previously non-displayed information.

20 Claims, 6 Drawing Sheets

TEMPORAL IDENTITY GRAPH

TECHNICAL FIELD

The present disclosure relates generally to risk assessment. More specifically, but not by way of limitation, this disclosure relates to risk assessment using a temporal identity graph.

BACKGROUND

Various interactions are performed frequently through an interactive computing environment such as a website, a user interface, etc. In cases of suspicious interactions or entities, a risk assessment analyst may conduct a manual inspection of data related to the interaction or entity in order to determine whether the interaction or entity is legitimate. In some cases, visualization of an identity graph with identity elements and other interactions related to the interaction or entity may expedite the analyst's risk assessment. However, there are a number of shortcomings in conventional techniques for visualizing the identity graphs. For example, connected components in the identity graphs can quickly lead to cluttered visualizations that can be hard for a risk assessment analyst to interpret. Additionally or alternatively, excessive amounts of additional metadata may be needed to fully explore the data in the identity graphs, which can make it more difficult to draw useful conclusions. Further, conventional identity graphs lack context needed to make informed decisions regarding risk assessments.

SUMMARY

Various aspects of the present disclosure provide systems and methods for generating a temporal identity graph for risk assessment. The system can include a processor and a non-transitory computer-readable medium that includes instructions are executable by the processor to cause the processor to perform various operations. The system can receive a request to visualize data relating to an entity and interactions associated with the entity. The system can receive entity data that indicates an identity of the entity and a set of interactions associated with the entity. The system can generate a temporal identity graph using the entity data. The temporal identity graph can temporally link the identity of the entity with the set of interactions associated with the entity. The system can generate a graphical user interface that may be configured to provide the temporal identity graph in response to the request to visualize data relating to the entity and the interactions associated with the entity. The graphical user interface can include a set of interactive elements representing the temporal identity graph. Each interactive element of the set of interactive elements can represent a different identity data point of the entity or a different interaction associated with the entity. Each interactive element of the set of interactive elements can be selected by a user of the graphical user interface to display previously non-displayed information about a corresponding identity data point of the entity or previously non-displayed information about a corresponding interaction associated with the entity.

In other aspects, a method can generate a temporal identity graph for risk assessment. The method can include receiving, by a computing device, a request to visualize data relating to an entity and interactions associated with the entity. The method can include receiving, by the computing device, entity data that indicates an identity of the entity and a set of interactions associated with the entity. The method can include generating, by the computing device, a temporal identity graph using the entity data. The temporal identity graph can temporally link the identity of the entity with the set of interactions associated with the entity. The method can include generating, by the computing device, a graphical user interface that may be configured to provide the temporal identity graph in response to the request to visualize data relating to the entity and the interactions associated with the entity. The graphical user interface can include a set of interactive elements that may represent the temporal identity graph. Each interactive element of the set of interactive elements can represent a different identity data point of the entity or a different interaction associated with the entity. Each interactive element of the set of interactive elements can be selected by a user of the graphical user interface to display previously non-displayed information about a corresponding identity data point of the entity or previously non-displayed information about a corresponding interaction associated with the entity.

In other aspects, a non-transitory computer-readable medium can include instructions that are executable by a processing device for causing the processing device to perform various operations. The operations can include receiving a request to visualize data relating to an entity and interactions associated with the entity. The operations can include receiving entity data that indicates an identity of the entity and a set of interactions associated with the entity. The operations can include generating a temporal identity graph using the entity data. The temporal identity graph can temporally link the identity of the entity with the set of interactions associated with the entity. The operations can include generating a graphical user interface that may be configured to provide the temporal identity graph in response to the request to visualize data relating to the entity and the interactions associated with the entity. The graphical user interface can include a set of interactive elements representing the temporal identity graph. Each interactive element of the set of interactive elements may represent a different identity data point of the entity or a different interaction associated with the entity. Each interactive element of the set of interactive elements can be selected by a user of the graphical user interface to display previously non-displayed information about a corresponding identity data point of the entity or previously non-displayed information about a corresponding interaction associated with the entity.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
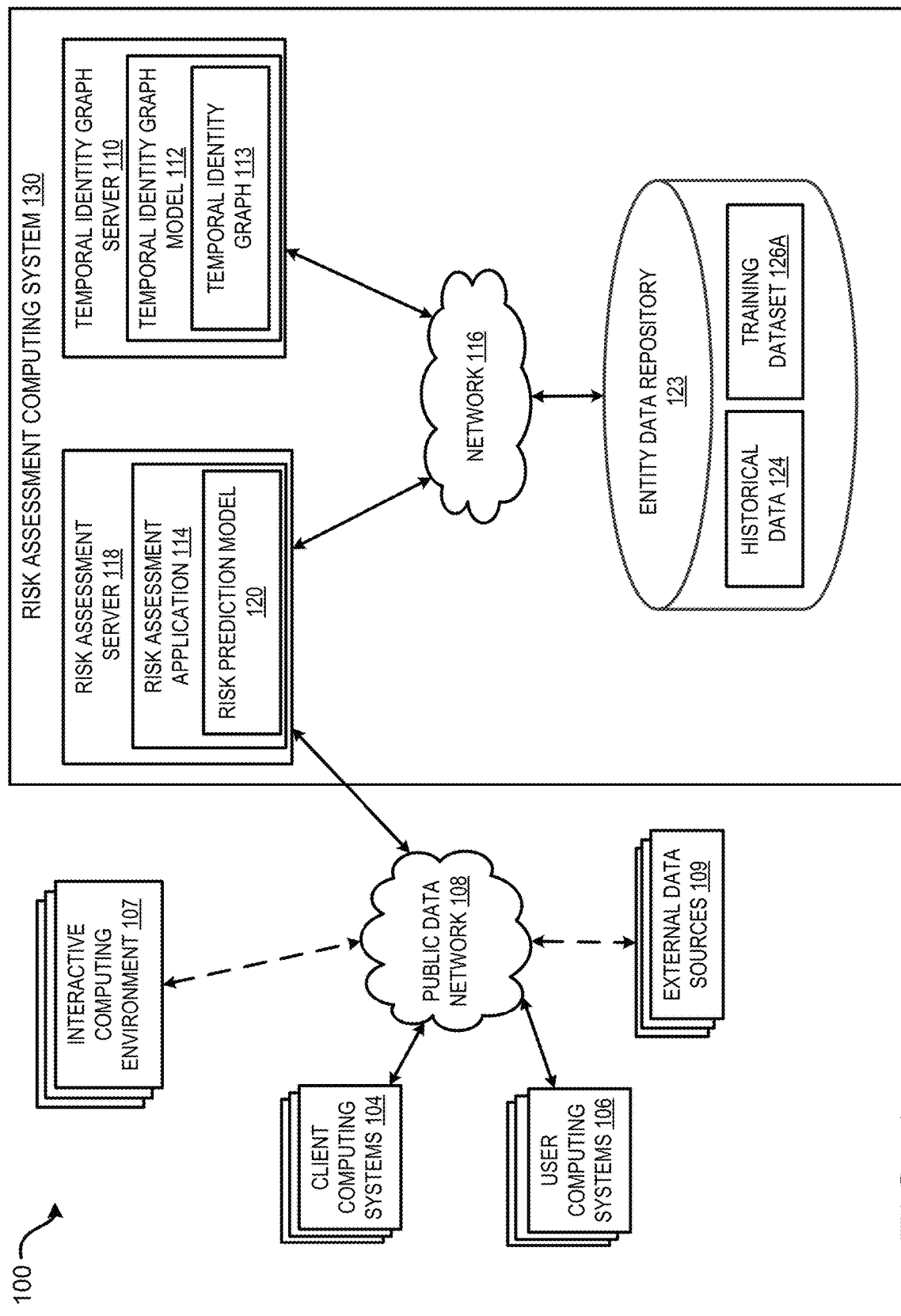
FIG. 1 is a block diagram depicting an example of a computing environment in which a temporal identity graph can be generated and used for risk assessment according to certain aspects of the present disclosure.

A temporal identity graph can be generated and used to improve a graphical user interface or other functions of a computing device. In some examples, the temporal identity graph can be used to provide an accurate risk assessment indicator, to visualize or otherwise provide access to data or inferences not otherwise accessible to an entity, to control access to an interactive computing environment, and the like. For example, generating an identity graph can facilitate decisions on access control, resource distribution, and the like. But the identity graph may not involve or otherwise consider contextual elements, such as time, that may be key factors for making informed decisions about risk assessment, access control, and the like. Additionally or alternatively, the identity graph may not facilitate efficient display of data in an interactive computing environment.

Certain aspects described herein for generating a temporal identity graph can address one or more issues identified above. For example, the temporal identity graph can be generated to include data associations not otherwise accessible by a user of a graphical user interface. Additionally, the temporal identity graph can be generated to provide a visualization of contextual information, such as temporal data, with respect to entity identity information, entity interaction data, and the like. Additionally, the temporal identity graph can be used to control access to an interactive computing environment. For example, in response to determining that an entity attempting to access the interactive computing environment is associated with historical fraudulent interactions, a computing device can determine to challenge or deny access of the entity to the interactive computing environment.

In some examples, the temporal identity graph can include a first set of nodes, a second set of nodes, and a set of connections. The first set of nodes can include nodes representing identity information about an entity, the second set of nodes can include nodes representing historical, or real-time or substantially contemporaneous, interactions associated with the entity, and the set of connections may connect one or more nodes of the first set of nodes or one or more nodes of the second set of nodes to the one or more nodes of the first set of nodes or to the one or more nodes of the second set of nodes, or any combination thereof. Additionally, the temporal identity graph may be generated to be provided via a graphical user interface to facilitate visualization of the underlying data of the temporal identity graph. For example, the temporal identity graph may be displayed on a graphical user interface that can include a set of interactive elements such as buttons, links, drop-down menus, and the like. Each interactive element of the set of interactive elements may represent a different identity data point of the entity, a different interaction associated with the entity, other suitable data about the entity, or a combination thereof. Additionally, each interactive element of the set of interactive elements may be configured to, upon selection by a user of the graphical user interface, display previously non-displayed information about a corresponding identity data point of the entity, previously non-displayed information about a corresponding interaction associated with the entity, etc.

In some examples, the graphical user interface may efficiently provide the temporal identity graph in an interactive computing environment. The graphical user interface may provide the temporal identity graph in a visually efficient way such that an entity using the graphical user interface is not overwhelmed by excessive information displayed on the graphical user interface. Additionally, the graphical user interface may provide potential access to all information included in the temporal identity graph, for example via the set of interactive elements. For example, the graphical user interface may explicitly display a subset of information included in the temporal identity graph and may embed the remaining information in the set of interactive elements. The entity may interact with one or more interactive elements of the set of interactive elements to cause the graphical user interface to display the requested information. Thus, the graphical user interface can provide the temporal identity graph in a visually efficient manner without losing information associated with the temporal identity graph.

In some examples, such as examples in which the temporal identity graph can be used to control access to an interactive computing environment, the interactive computing environment can be provided by a client computing system. The client computing system can be, or can be associated with, a provider entity, an organization, or the like that may provide software as a service, infrastructure as a service, and other suitable services accessible by a user computing system that can be used by the entity, which may be or include a user of the graphical user interface. In some examples, the interactive computing environment can include the graphical user interface or any other suitable user interface. The entity can use the user computing system to request access to a particular user interface that can be used to request services or other suitable computing resources from the client computing system. For example, the entity can request a financial loan, cloud computing storage resources, or any other suitable services or computing resources from the client computing system via the interactive computing environment. In other examples, the interactive computing environment can include one or more websites or sub-pages thereof. For example, the interactive computing environment can include a secure website provided by the client computing system. The secure website can include cloud computing storage or other resources, and the client computing system can control access of the target entity to the secure website via the entity profile and, optionally, other suitable security techniques such as multifactor authentication, username/password combinations, etc.

Certain aspects described herein, which can include generating the temporal identity graph, generating the graphical user interface for providing the temporal identity graph, and the like, can improve the technical fields of user interfaces, access control for a computing environment, and the like. For instance, by using the temporal identity graph, a risk assessment computing system may provide legitimate access to the interactive computing environment using fewer computing resources compared to other risk assessment systems. For example, the temporal identity graph can be determined using fewer data points received about the entity and using inferences illustrated by the temporal identity graph. Accordingly, the risk assessment computing system improves the access control for computing environment by reducing memory usage, processing time, network bandwidth consumption, response time, and the like with respect to controlling access to the interactive computing environment using the temporal identity graph. Additionally, the graphical user interface that is configured to display the temporal identity graph may be or include one or more improvements to graphical user interfaces. For example, the graphical user interface may provide contextual information, such as temporal data or metadata about the underlying data of the temporal identity graph, via the temporal identity graph, may specifically arrange the underlying data of the temporal identity graph to facilitate previously unknown inferences about the underlying data, and the like. Thus, the graphical user interface improves the functioning of a computing device by the specific arrangement and function of interactive elements of the temporal identity graph displayed via the graphical user interface.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Generating a Temporal Identity Graph for Risk Assessment Referring now to the drawings, FIG. 1 is a block diagram illustrating an example of a computing environment 100 in which a temporal identity graph 113 can be generated and used for risk assessment according to certain aspects of the present disclosure. FIG. 1 illustrates examples of hardware components of a risk assessment computing system 130 according to some aspects. The risk assessment computing system 130 can be or include a specialized computing system that may be used for processing large amounts of data, such as for generating the temporal identity graph 113, for controlling access to the interactive computing environment 107, etc., using a large number of computer processing cycles. The risk assessment computing system 130 can include a risk assessment server 118 for validating risk assessment data from various sources. In some examples, the risk assessment computing system 130 can include other suitable components, servers, subsystems, etc.

The risk assessment server 118 can include one or more processing devices that can execute program code such as a temporal identity graph model 112, a risk assessment application 114, and the like. The program code can be stored on a non-transitory computer-readable medium or other suitable medium. The temporal identity graph model 112 can execute one or more processes to generate the temporal identity graph 113 for use in risk assessment, for use in controlling access to the interactive computing environment 107, or a combination thereof. The risk assessment server 118 can perform risk assessment validation operations or access control operations for validating or otherwise authenticating (e.g., using other suitable modules, models, components, etc. of the risk assessment server 118) received data such as authentication data received from the user computing systems 106. In some aspects, the risk assessment application 114 can authenticate the request by utilizing the temporal identity graph 113, or any score or inference determined therefrom. The temporal identity graph 113 can be determined using received entity data that can include real-time streamed data about an entity, real-time produced data about the entity, historical data, such as historical data 124, associated with the entity, etc.

The received entity data can be determined or otherwise received and can be stored in one or more network-attached storage units on which various repositories, databases, or other structures can be stored. Examples of the data structures can include an entity data repository 123. Additionally or alternatively, a training dataset 126 can be stored in the entity data repository 123. In some examples, the training dataset 126 can be used to train one or more machine-learning models, which may include the risk assessment application 114, the temporal identity graph model 112, etc. The one or more machine-learning models can be trained to determine the temporal identity graph 113, to determine scores or inferences about the entity based on the temporal identity graph 113, to control access to the interactive computing environment 107 using the temporal identity graph 113 or scores or inferences determined therefrom, or to otherwise provide digital enablement for the entity.

Network-attached storage units may store a variety of different types of data organized in a variety of different ways and from a variety of different sources. For example, the network-attached storage unit may include storage other than primary storage located within the risk assessment server 118 that is accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include a magnetic disk or tape, optical storage media such as a compact disk or digital versatile disk, flash memory, memory devices, or other suitable media.

Furthermore, the risk assessment computing system 130 can communicate with various other computing systems. The other computing systems can include user computing systems 106 (e.g., smartphones, personal computers, etc.), client computing systems 104, and other suitable computing systems. For example, user computing systems 106 may send (e.g., in response to receiving input from the entity) requests for accessing the interactive computing environment 107 to the client computing systems 104. In response, the client computing systems 104 can send the authentication queries to the risk assessment server 118, and the risk assessment server 118 can receive entity data about the entity for generating and using the temporal identity graph 113. While FIG. 1 illustrates the risk assessment computing system 130 and the client computing systems 104 as separate systems, they can be one system. For example, the risk assessment computing system 130 can be included in the client computing systems 104, or vice versa.

As illustrated in FIG. 1, the risk assessment computing system 130 may interact with the client computing systems 104, the user computing systems 106, or a combination thereof via one or more public data networks 108 to facilitate interactions between users of the user computing systems 106 and the interactive computing environment 107. For example, the risk assessment computing system 130 can facilitate the client computing systems 104 providing a user interface to the user computing system 106 for receiving various data from the user. The risk assessment computing system 130 can transmit validated risk assessment data, for example inferences about the temporal identity graph 113, scores determined therefrom, etc., to the client computing systems 104 for providing (or challenging, rejecting, otherwise controlling, etc.) access of the entity to the interactive computing environment 107, or to provide other suitable risk assessments. In some examples, the risk assessment computing system 130 can additionally communicate with third-party systems through the public data network 108 to receive additional risk assessment or entity data, etc. For example, the third-party systems can provide real-time, or streamed, data about the entity, historical data about the entity, etc. to the risk assessment computing system 130.

Each client computing system 104 may include one or more devices that may include individual servers or groups of servers operating in a distributed manner. A client computing system 104 can include any computing device or group of computing devices operated by a seller, a lender, a provider, or other suitable entity that can provide products or services. The client computing system 104 can include one or more server devices. The one or more server devices can include or can otherwise access one or more non-transitory computer-readable media.

The client computing system 104 can further include one or more processing devices that can be configured to provide an interactive computing environment 107, such as a user interface, etc., that can perform various operations. The interactive computing environment 107 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 106 to access various functions of the interactive computing environment 107. For instance, the interactive computing environment 107 may transmit data to and receive data (e.g., via the graphical interface) from a user computing system 106 to shift between different states of the interactive computing environment 107, where the different states allow one or more electronics interactions between the user computing system 106 and the client computing system 104 to be performed.

In some examples, the client computing system 104 may include other computing resources associated therewith, which may not be illustrated in FIG. 1, such as server computers hosting and managing virtual machine instances for providing cloud computing services, server computers hosting and managing online storage resources for users, server computers for providing database services, and others. The interaction between the user computing system 106, the client computing system 104, and the risk assessment computing system 130, or any suitable sub-combination thereof may be performed through graphical user interfaces (e.g., the user interface) presented by the risk assessment computing system 130, the client computing system 104, other suitable computing systems of the computing environment 100, or any suitable combination thereof. The graphical user interfaces can be presented to the user computing system 106. Application programming interface (API) calls, web service calls, or other suitable techniques can be used to facilitate interaction between any suitable combination or sub-combination of the client computing system 104, the user computing system 106, and the risk assessment computing system 130.

A user computing system 106 can include any computing device or other communication device operated by a user or entity such as a consumer or a customer. The user computing system 106 can include one or more computing devices such as laptops, smartphones, and other personal computing devices. A user computing system 106 can include executable instructions stored in one or more non-transitory computer-readable media. The user computing system 106 can additionally include one or more processing devices configured to execute program code to perform various operations. In various examples, the user computing system 106 can allow a user to access certain online services or other suitable products, services, or computing resources from a client computing system 104, to engage in mobile commerce or other interactions with the client computing system 104, to obtain controlled access to electronic content, such as the interactive computing environment 107, hosted by the client computing system 104, etc.

The entity can use the user computing system 106 to engage in an electronic interaction with the client computing system 104 via the interactive computing environment 107. The risk assessment computing system 130 can receive a request, for example from the user computing system 106, to access the interactive computing environment 107 and can use data, such as the temporal identity graph 113 or any suitable scores determined therefrom, to determine whether to provide access, to challenge the request, to deny the request, etc. An electronic interaction between the user computing system 106 and the client computing system 104 can include, for example, the user computing system 106 being used to request a financial loan, to request online computing resources, or other suitable services or products from the client computing system 104, etc. An electronic interaction between the user computing system 106 and the client computing system 104 can also include, for example, one or more queries for a set of sensitive or otherwise controlled data, accessing online confidential services provided via the interactive computing environment 107, submitting an online credit card application or other digital application to the client computing system 104 via the interactive computing environment 107, operating an electronic tool within the interactive computing environment 107 (e.g., a content-modification feature, an application-processing feature, etc.), etc.

In some aspects, an interactive computing environment 107 implemented through the client computing system 104 can be used to provide access to various online functions. As a simplified example, a user interface or other interactive computing environment 107 provided by the client computing system 104 can include electronic functions for requesting computing resources, online storage resources, network resources, database resources, or other types of resources. In another example, a website or other interactive computing environment 107 provided by the client computing system 104 can include electronic functions for obtaining one or more financial services, such as an asset report, management tools, credit card application and transaction management workflows, electronic fund transfers, etc.

A user computing system 106 can be used to request access to the interactive computing environment 107 provided by the client computing system 104. The client computing system 104 can submit a request, for example in response to a request made by the user computing system 106 to access the interactive computing environment 107, for risk assessment to the risk assessment computing system 130 and can selectively grant or deny access to various electronic functions based on risk assessment performed by the risk assessment computing system 130. Based on the request, the risk assessment computing system 130 can generate the temporal identity graph 113 for an entity that submitted the request via the user computing system 106. Based on the temporal identity graph 113, or any suitable score or inference determined therefrom, generated by the temporal identity graph server 110, the risk assessment computing system 130, the client computing system 104, or a combination thereof can determine whether to grant the access request of the user computing system 106 to certain features of the interactive computing environment 107.

In a simplified example, the system depicted in FIG. 1 can configure the risk assessment server 118 to be used for controlling access to the interactive computing environment 107. The risk assessment server 118 can receive data about an entity that submitted a request to access the interactive computing environment 107, for example, based on the information (e.g., collected by the client computing system 104 via a user interface provided to the user computing system 106) provided by the client computing system 104 or received via other suitable computing systems. The risk assessment server 118 can receive, for example from the temporal identity graph server 110, the temporal identity graph 113 for the entity such that the temporal identity graph 113 is based on the received data about the entity. In some examples, the risk assessment server 118 can determine one or more scores for the entity based on the temporal identity graph 113. The risk assessment server 118 can transmit the one or more scores, or other suitable inferences associated with the temporal identity graph 113 itself, to the client computing system 104 for use in controlling access to the interactive computing environment 107 or for other suitable risk assessment purposes. The one or more scores may be determined from the temporal identity graph 113, for example, by using graph analysis, or by applying the temporal identity graph 113 to a machine learning model trained on a set of temporal identity graphs.

In some examples, the temporal identity graph 113 or any suitable score or inference determined therefrom can be used, for example by the risk assessment computing system 130, the client computing system 104, etc., to determine whether the risk associated with the entity accessing a service provided by the client computing system 104 exceeds a threshold, thereby granting, challenging, or denying access by the entity to the interactive computing environment 107. For example, if the risk assessment computing system 130 determines that the temporal identity graph 113 or associated scores or inferences indicate that risk of the entity is lower than a threshold value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 can also allocate resources to the entity and provide a dedicated web address or network address for the allocated resources to the user computing system 106, for example, by adding the user computing system 106 in the access permission. With the obtained access credentials or the dedicated web address, the user computing system 106 can establish a secure network connection to the interactive computing environment 107 hosted by the client computing system 104 and access the resources via invoking API calls, web service calls, HTTP requests, other suitable mechanisms or techniques, etc.

In some examples, the risk assessment computing system 130 may determine whether to grant, challenge, or deny the access request made by the user computing system 106 for accessing the interactive computing environment 107. For example, based on the temporal identity graph 113 or associated scores or inferences, the risk assessment computing system 130 can determine that the entity is a legitimate entity that made the access request and may authenticate the request. In other examples, the risk assessment computing system 130 can challenge or deny the access attempt if the risk assessment computing system 130 determines that the entity may not be a legitimate entity.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices illustrated in FIG. 1 is provided for illustrative purposes. Different numbers of devices may be used. For example, while certain devices or systems are illustrated as single devices in FIG. 1, multiple devices may instead be used to implement these devices or systems. Similarly, devices or systems that are shown as separate, such as the risk assessment server 118 and the entity data repository 123, may be instead implemented in a single device or system. Similarly and as discussed above, the risk assessment computing system 130 may be included in the client computing system 104.

Techniques for Generating a Temporal Identity Graph

Figure 2:
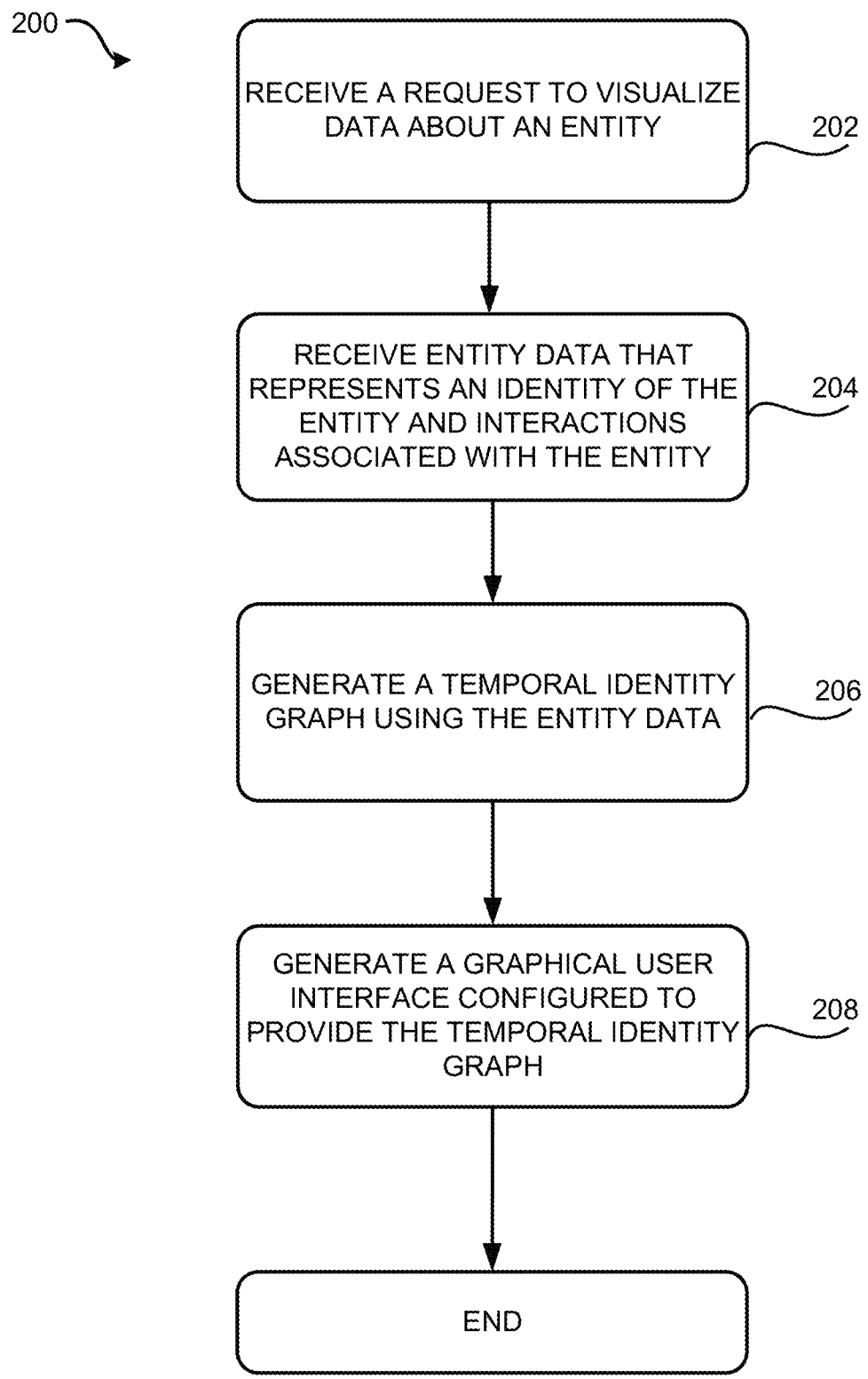
FIG. 2 is a flowchart depicting an example of a process for generating a graphical user interface having a temporal identity graph according to certain aspects of the present disclosure.

FIG. 2 is a flowchart depicting an example of a process 200 for generating a graphical user interface having a temporal identity graph 113 according to certain aspects of the present disclosure. One or more computing devices, such as the risk assessment computing system 130, can implement the operations illustrated in FIG. 2 by executing suitable program code such as the temporal identity graph model 112. For illustrative purposes, the process 200 is described with reference to certain examples illustrated in the figures. Other implementations, however, are possible.

At block 202, the process 200 involves receiving a request to visualize data about an entity. The data may include identity data, interaction data, other suitable data, or any combination thereof. The identity data may imply or otherwise represent an identity of the entity. The interaction data may be or include data about historical or substantially contemporaneous interactions in which the entity was or is involved. The request may be generated, submitted, or a combination thereof by the client computing systems 104, by a user of the risk assessment computing system 130, by other entities or computing devices, or any suitable combination thereof. In a particular example, the risk assessment computing system 130 may receive a request from the client computing systems 104 for determining a risk assessment for an entity attempting to access an interactive computing environment 107. The risk assessment computing system 130 may generate and submit a request, for example to the temporal identity graph server 110, the temporal identity graph model 112, etc., to generate a temporal identity graph 113 to facilitate risk assessment determinations regarding the entity or the request from the client computing systems 104.

At block 204, the process 200 involves receiving entity data that represents an identity of the entity and that represents interactions associated with the entity. The entity data can include historical entity data, such as the historical data 124, and the entity data can include real-time, or substantially contemporaneous, data about the entity. In some examples, the risk assessment computing system 130 can access real-time data via the public data network 108, the risk assessment computing system 130 can access the historical data 124 by accessing the entity data repository 123, etc. The entity data received by the risk assessment computing system 130 can include identity data points, interaction data points, and the like that can be input into or otherwise transmitted to the temporal identity graph model 112 for facilitating generation of the temporal identity graph 113.

The identity data points can include one or more names, one or more physical addresses, one or more digital addresses, one or more email addresses, one or more Social Security numbers, one or more driver license numbers, one or more phone numbers, and other identity data points that may be used to identify the entity. The identity data points may be associated with an electronic interaction, a real-world interaction, or a combination thereof. For example, the entity may request access to online computing resources, and, to gain access to the online computing resources, the entity may provide authentication information that may include one or more of the foregoing identity data points. Additionally or alternatively, the interaction data points can include a date of a respective interaction, an amount of resources associated with the respective interaction, a source or destination of resources transferred for the respective interaction, entities involved in the respective interaction, and other suitable interaction data points. The respective interaction may be or include an interaction between the entity and one or more other entities. The entity may have initiated the respective interaction, or the entity may otherwise be involved in the respective interaction. Additionally or alternatively, the interaction data points may be associated with identity data points generated with respect to the respective interaction.

At block 206, the process 200 involves generating the temporal identity graph 113 using the entity data. The risk assessment computing system 130, or any component thereof (e.g., the temporal identity graph model 112), may generate one or more sets of nodes, one or more sets of connections, and the like for the temporal identity graph 113. In some examples, the one or more sets of nodes can include a first set of nodes and a second set of nodes. The first set of nodes can include one or more nodes that may each represent a different identity data point associated with the entity, and the second set of nodes can include one or more nodes that may each represent a different interaction data point associated with the entity. Each connection of the one or more connections may link a first node to a second node in the temporal identity graph 113. In some examples, the first node may be included in the first set of nodes and the second node may be included in the second set of nodes, the first node and the second node may be included in the first set of nodes, or any permutation thereof.

At block 208, the process 200 involves generating a graphical user interface that is configured to provide the temporal identity graph 113. The graphical user interface may be generated to be present (e.g., display) the temporal identity graph 113. For example, the graphical user interface can be generated and output on a display device associated with the risk assessment computing system 130. In other examples, the risk assessment computing system 130 may generate the graphical user interface and transmit the graphical user interface to a separate computing system such as the client computing systems 104. The risk assessment computing system 130 can use the temporal identity graph 113 to control access to the interactive computing environment 107. For example, the temporal identity graph model 112 can output the temporal identity graph 113, and the risk assessment computing system 130 can input the temporal identity graph 113 into the risk prediction model 120. The risk prediction model 120 can output one or more risk indicators associated with the entity based at least in part on the temporal identity graph 113, and the risk assessment computing system 130 can control access to the interactive computing environment 107 using the output of the risk prediction model 120.

The temporal identity graph 113 can be displayed on the graphical user interface. In some examples, the one or more sets of nodes and the one or more sets of connections of the temporal identity graph 113 can be arranged on the graphical user interface to provide or otherwise facilitate previously unattainable or previously unknown information about the entity, or any identity or interaction associated therewith. For example, the first set of nodes, which may correspond to identity data points about the entity, may be arranged vertically with respect to a temporally first (e.g., at a top portion of the graphical user interface) corresponding node of the second set of nodes, which may represent interaction data points associated with the entity. Additionally or alternatively, the first set of nodes may be arranged horizontally with respect to other nodes of the first set of nodes. In some examples, the second set of nodes may be arranged vertically offset from one another on a vertical axis that represents time. Interaction data can be provided along the vertical axis that represents time. For example, a first interaction involving the entity, or identity associated therewith, can be provided at a top, or temporally first, location of the temporal identity graph. Subsequent interactions can be provided below the first interaction in chronological order. Identity data points (e.g., the first set of nodes) may be linked with corresponding interactions, and an entity, or other user of the graphical user interface, can select one or more nodes of the first set of nodes or of the second set of nodes to cause the graphical user interface to provide additional information about the selected node and associated (e.g., connected) nodes. Additionally or alternatively, each node of the second set of nodes may be color-coded to indicate a respective type of interaction indicated by the node.

The arrangement of the one or more sets of nodes and the one or more connections of the temporal identity graph 113 may facilitate inferences and other determinations to be made. For example, the arrangement of the one or more sets of nodes and the one or more connections of the temporal identity graph 113 may allow a user of the graphical user interface to determine that fraud is associated with the entity even if other techniques may not indicate that fraud is associated with the entity. Additionally or alternatively, since the temporal identity graph 113 is arranged with respect to time and includes contextual information (e.g., node placement) relating to timing of interactions (e.g., real-time, historic, or a combination thereof), the graphical user interface can display the temporal identity graph 113 to reveal previously unknown information about the identity of the entity, interactions involving the entity, or a combination thereof. For example, the graphical user interface can display the temporal identity graph 113 that may indicate a start day or time of multiple instances of fraudulent activity that were previously unknown or not known to be associated with one another.

Figure 3:
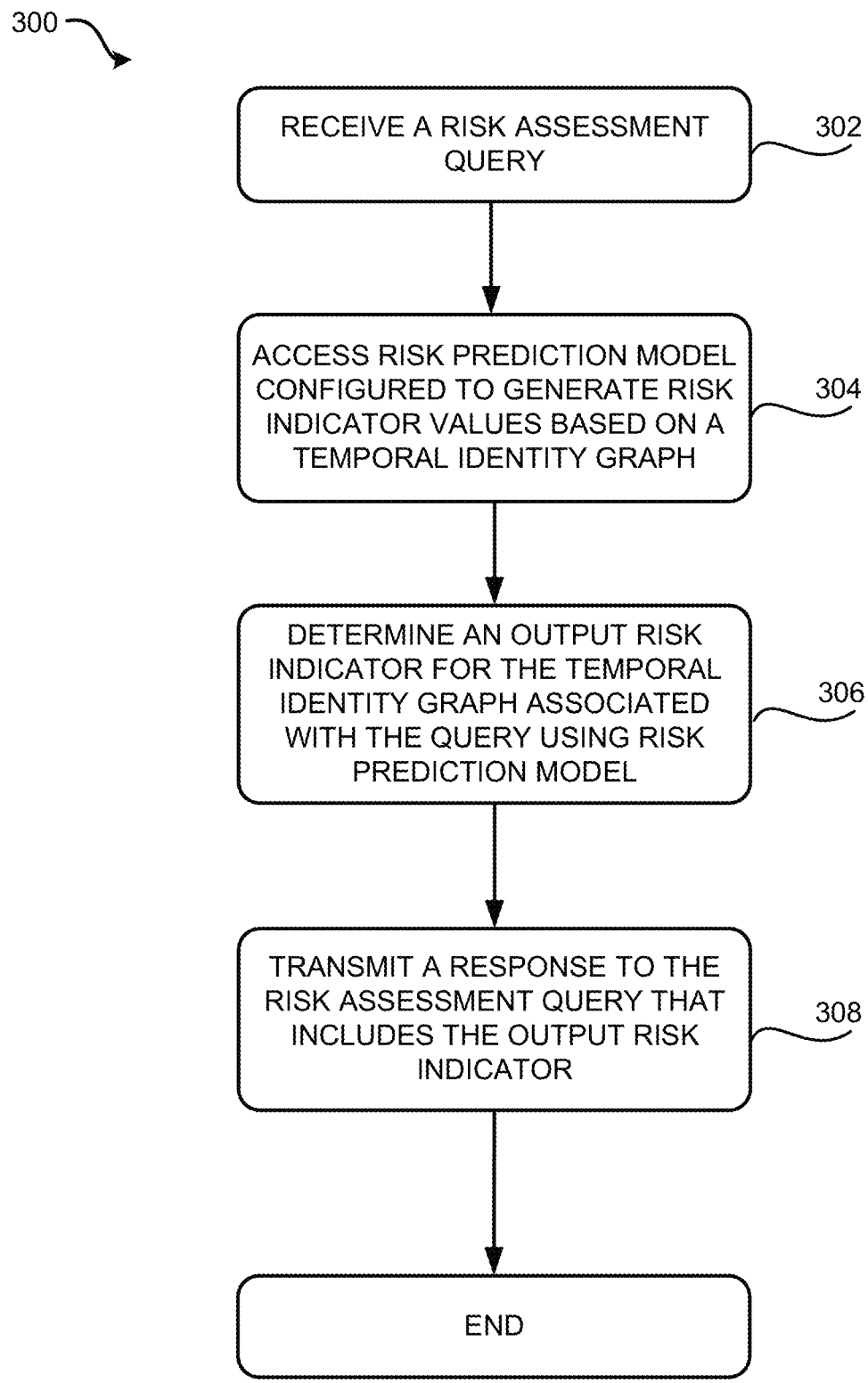
FIG. 3 is a flowchart depicting an example of a process for responding to a risk assessment query using a temporal identity graph according to certain aspects of the present disclosure.

Techniques for Controlling Access to a Computing Environment Using a Temporal Identity Graph FIG. 3 is a flow chart depicting an example of a process 300 for controlling access to an interactive computing environment 107 using a temporal identity graph 113 according to certain aspects of the present disclosure. One or more computing devices, such as the risk assessment computing system 130, can implement operations illustrated in FIG. 3 by executing suitable program code such as the temporal identity graph model 112, the risk prediction model 120, and the like. For illustrative purposes, the process 300 is described with reference to certain examples illustrated in the figures. Other implementations, however, are possible.

At block 302, the process 300 involves receiving a risk assessment query for a target entity from a remote computing device, such as a computing device associated with the target entity requesting the risk assessment. The risk assessment query can also be received by the risk assessment server 118 from a remote computing device associated with an entity authorized to request risk assessment of the target entity. In some examples, the target entity may be an entity that requests access to the interactive computing environment 107, that requests access to online computing resources, that requests access to other suitable products or services, or any combination thereof.

At block 304, the process 300 involves accessing a risk prediction model 120 trained to generate risk indicator values based on a temporal identity graph 113 associated with a target entity. The risk prediction model 120 may receive the temporal identity graph 113, for example as an input, from the temporal identity graph model 112. In some examples, the risk prediction model 120 may additionally or alternatively be or may include one or more proprietary models, such as machine-learning models, etc., one or more heuristics models, one or more simulation models, or any combination thereof. The temporal identity graph 113 can be generated based on entity data received by the risk assessment computing system 130. As described in more detail with respect to FIG. 1 above, examples of entity data can include real-time data and historical data associated with the target entity that describes prior actions or interactions, and an identity of the target entity associated therewith, involving the target entity (e.g., information that can be obtained from credit files or records, financial records, consumer records, online interactions, or other data about the activities or characteristics of the entity), behavioral traits of the target entity, demographic traits of the target entity, or any other traits that may be used to predict risks associated with the target entity. In some aspects, the historical data about the target entity can be obtained from credit files, financial records, consumer records, etc.

At block 306, the process 300 involves determining a risk indicator for the target entity based on the temporal identity graph 113 using the risk prediction model 120. The temporal identity graph 113, or any suitable risk score or inference determined or received therefrom, can be used as input to the risk prediction model 120. The temporal identity graph 113 associated with the target entity can be generated by extracting features from received or produced entity data and by determining signals based on the extracted features. The output of the risk prediction model 120 can include the risk indicator for the target entity. In some examples, the risk prediction model 120 can determine associations between nodes or connections included in the temporal identity graph 113, can infer relationships between data points included in the temporal identity graph 113, or the like. The risk prediction model 120 can determine the risk indicator based at least in part on the associations, the connections, and the like.

At block 308, the process 300 involves transmitting a responsive message based on the risk indicator, for example the risk indicator determined at the block 306. In some examples, the risk assessment server 118, or any other suitable module, model, or computing device, can transmit the responsive message to a computing device, such as the client computing system 104, or any other suitable computing device that can control access to the interactive computing environment 107. The responsive message can vary based on the risk indicator. For example, the responsive message may indicate that the target entity submitting the access request is the legitimate entity and may recommend granting access to the interactive computing environment 107 based on the request. In other examples, the responsive message may indicate that the entity is unknown or otherwise not associated with legitimate activity and may recommend challenging or denying the request.

In some examples, the responsive message may be generated and transmitted based on the temporal identity graph 113. For example, the risk prediction model 120 can generate one or more risk indicators for the target entity based at least in part on the temporal identity graph 113, and the risk assessment server 118 can generate the responsive message based on the one or more risk indicators. The one or more risk indicators can include a credit score, a fraud score, an identity score, other suitable scores or inferences indicating risk in one or more dimensions associated with the target entity, or any suitable combination thereof. The risk prediction model 120 can generate the risk indicator based on any combination of nodes and connections, or any inferences derived therefrom, included in the temporal identity graph 113, can generate the risk indicator by analyzing or querying the temporal identity graph 113, and the like. The risk assessment server 118 can determine, based on the one or more risk indicators generated by the risk prediction model 120, whether to recommend granting, challenging, or denying the request submitted by the target entity. In some examples, the risk assessment computing system 130 can generate and transmit the responsive message to grant, challenge, or deny the request based on a recommendation provided by the risk prediction model 120.

Examples of a Temporal Identity Graph

Figure 4A:
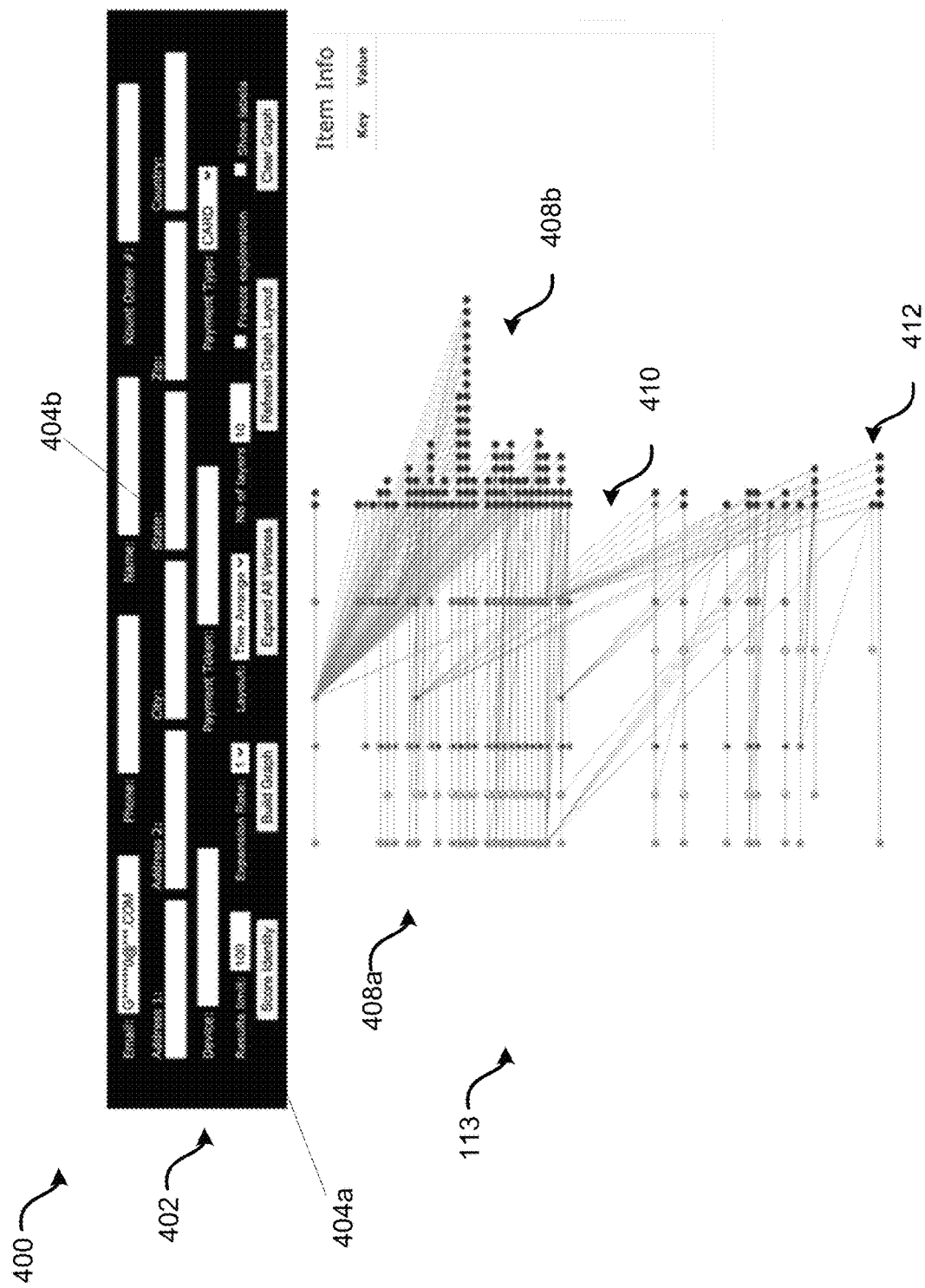
FIG. 4A is an example of a graphical user interface with a temporal identity graph displayed according to certain aspects of the present disclosure.
Figure 4B:
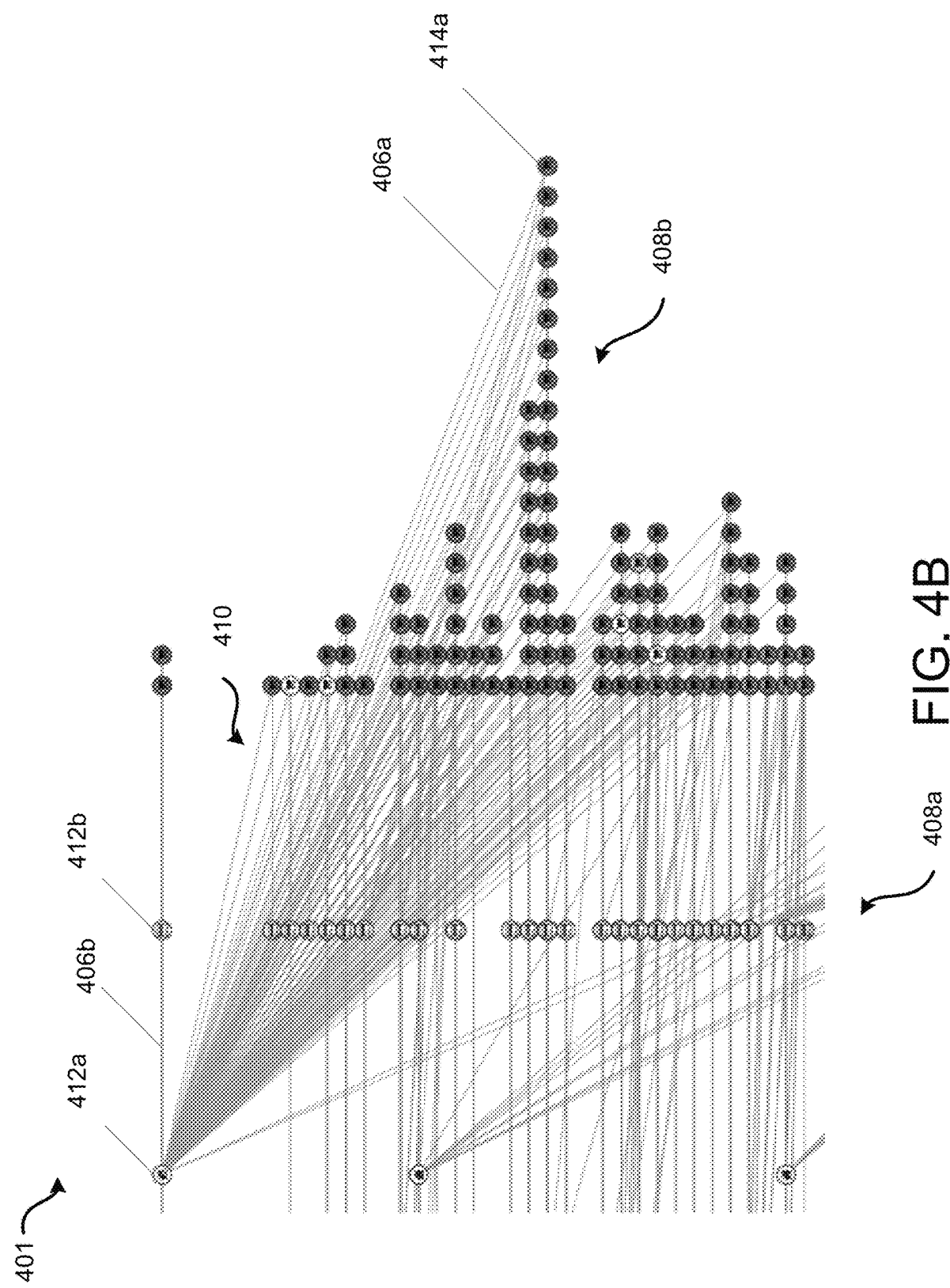
FIG. 4B is an example of a zoomed-in portion of the graphical user interface of FIG. 4A.

FIG. 4A is an example of a graphical user interface 400 with a temporal identity graph 113 displayed, and FIG. 4B is an example of a zoomed-in portion 401 of the graphical user interface 400 according to certain aspects of the present disclosure. As illustrated in FIG. 4A, the graphical user interface 400 can include a set of fields 402 and the temporal identity graph 113. The set of fields 402 can be used, for example by a user of the graphical user interface 400, to adjust the temporal identity graph 113, to query the temporal identity graph 113, and the like. For example, a first field 404a of the set of fields 402 may be used to adjust the temporal identity graph 113, such as by expanding or minimizing a number of data points of the temporal identity graph 113. In another example a second field 404b of the set of fields 402 may be used to query the temporal identity graph 113 to identify a particular entity identity data point, to identify a particular interaction data point, etc.

In some examples, and as illustrated with respect to FIGS. 4A-4B, the temporal identity graph 113 can include a first set of nodes 408a, a second set of nodes 408b, and a set of connections 410. The set of connections 410 may link, such as visually link, nodes from the first set of nodes 408a, of the second set of nodes 408b, or from a combination thereof. In a particular example, a first node 412a from the first set of nodes 408a may be connected to a first node 414a of the second set of nodes 408b via a first connection 406a of the set of connections 410. Additionally or alternatively, the first node 412a of the first set of nodes 408a may be connected to a second node 412b of the first set of nodes 408a via a second connection 406b of the set of connections 410. Nodes that are connected with the connections may indicated that the nodes are associated with one another. For example, the first node 412a may represent an identity data point, such as a name of an entity, and the first node 414a may represent an interaction data point such as an online interaction between the entity and a separate entity. The first connection 406a may indicate that the identity data point of the first node 412a is associated with (e.g., used to initiate or authenticate the online interaction) the interaction data point of the first node 414a.

In some examples, the first set of nodes 408a and the second set of nodes 408b may be arranged on the graphical user interface 400 to enhance the graphical user interface 400. For example, an arrangement of the first set of nodes 408a with respect to the second set of nodes 408b, for example using the set of connections 410, may reveal previously unknown or unattainable information, contextual data, and the like regarding the entity data underlying the temporal identity graph 113. In a particular example, the arrangement of the foregoing nodes may reveal that a set of suspicious interactions or a set of fraudulent interactions began at a certain day and time and that subsequent interactions, previously thought to be legitimate, may not actually be legitimate and may instead be associated with the set of suspicious interactions or the set of fraudulent interactions. Since the first set of nodes 408a and the second set of nodes 408b can be arranged and ordered with respect to time, the risk assessment computing system 130, a user of the graphical user interface 400, or a combination thereof can determine additional information about the entity and interactions associated therewith that may not have been accessible prior to using the graphical user interface 400. Additionally or alternatively, at least a first subset of the first set of nodes 408a or at least a second subset of the second set of nodes 408b may be or include interactive elements. For example, a user of the graphical user interface 400 may select a node of the first subset or a node of the second subset to cause the graphical user interface 400 to adjust the temporal identity graph 113 to illustrate previously non-displayed information, previously unknown or unattainable information, or a combination thereof. The graphical user interface 400 may receive input from the user indicating the user selected the first node 412a. In response to the selection of the first node 412a, the graphical user interface 400 may generate and provide additional information, such as temporal data, identity data, interaction data, and the like, regarding the first node 412a, etc. In a particular example, the first node 412a may, when selected, reveal a pattern of interactions involving a particular identity that is associated with fraudulent activity and that is associated with other fraudulent identities.

The first set of nodes 408a may be arranged vertically with respect to a temporally initial corresponding node of the second set of nodes 408b. Additionally or alternatively, the first set of nodes 408a may be arranged horizontally with respect to at least a subset of the first set of nodes 408a. The second set of nodes 408b may be arranged vertically offset from at least a subset of the second set of nodes 408b on a vertical axis that represents time. Additionally or alternatively, each node of the second set of nodes 408b may be color-coded based on a type of interaction represented by the node. For example, the node may be colored green for an online commerce interaction, may be colored yellow for a security interaction, may be colored orange for an interaction involving online computing resources, or any other suitable color scheme.

In some examples, the graphical user interface 400 can provide (e.g., display) indications of fraudulent interactions, indications of fraudulent identities, and the like. The graphical user interface 400 can provide the temporal identity graph as an output display. The nodes, such as the first set of nodes 408a and the second set of nodes 408b, can be displayed on the graphical user interface, and patterns, for example based at least in part on temporal relationships between the nodes, can become apparent to an entity using the graphical user interface 400. A suspicious interaction may be indicated on the graphical user interface 400 as not conforming to an established pattern of interactions involving a common entity. For example, one or more interactions involving an excessive amount of resources for a product or service considered rare or otherwise uninteresting by the common entity may be suspicious.

The graphical user interface 400 may be used to identify the suspicious interaction or interactions, and the graphical user interface 400 may be used to identify subsequent interactions that follow a pattern associated with the suspicious interaction or that are otherwise additionally suspicious. For example, a set of nodes 412, which may be similar in type to the second set of nodes 408b, may be displayed on the graphical user interface 400 temporally separated from other nodes displayed on the graphical user interface 400. The set of nodes 412 may indicate fraudulent activity, and, due to the temporal arrangement of nodes on the graphical user interface 400, at least an approximate time or date of an initial fraudulent activity or interaction may be easily identifiable by an entity performing a risk assessment.

The examples disclosed herein present the above advantages over identity graphs. For example, traditional identity graphs do not include a temporal element, requiring an analyst to parse a number of transactions to identify those that are potentially fraudulent. Additionally, in cases in which the number of valid transactions is greater than the number of fraudulent transactions, it is difficult to identify a compromised identity because the cluster of transactions generally appears to be valid as a whole. In contrast, the temporal identity graph interface temporally arranges nodes such that the point in time at which fraudulent or suspicious transactions begins is clearly displayed.

Example of Computing System

Figure 5:
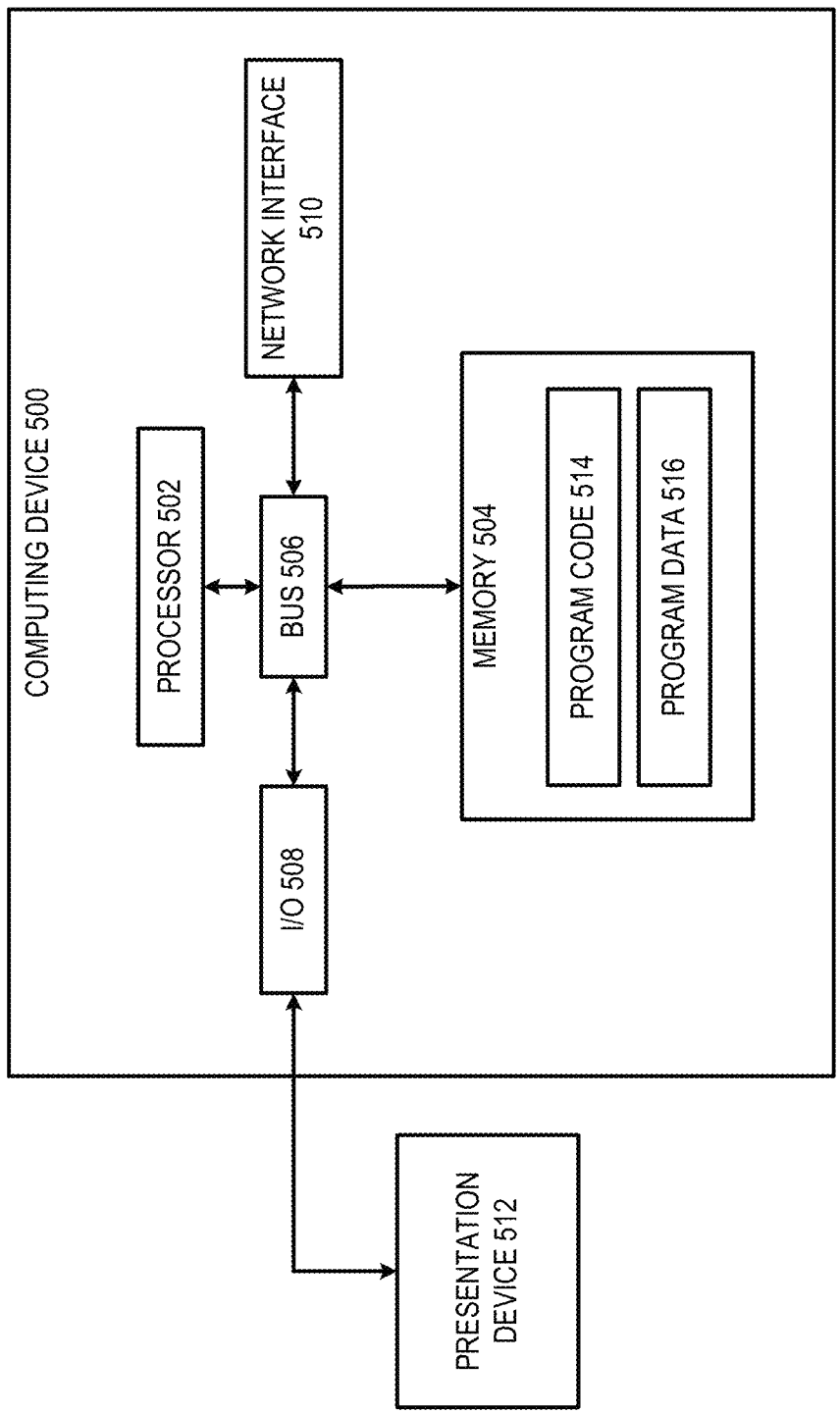
FIG. 5 is a block diagram depicting an example of a computing system suitable for implementing aspects of the techniques and technologies presented herein.

Any suitable computing system or group of computing systems can be used to perform the operations for the machine-learning operations described herein. For example, FIG. 5 is a block diagram illustrating an example of a computing device 500, which can be used to implement the risk assessment server 118 or other suitable components of the computing environment 100. The computing device 500 can include various devices for communicating with other devices in the computing environment 100, as described with respect to FIG. 1. The computing device 500 can include various devices for performing one or more data consolidation or validation (or other suitable) operations described above with respect to FIGS. 1-4B.

The computing device 500 can include a processor 502 that is communicatively coupled to a memory 504. The processor 502 can execute computer-executable program code stored in the memory 504, can access information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 502 can include a microprocessor, an application-specific integrated circuit (ASIC), a field-programmable gate array (FPGA), or any other suitable processing device. The processor 502 can include any suitable number of processing devices, including one. The processor 502 can include or communicate with a memory 504. The memory 504 can store program code that, when executed by the processor 502, causes the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 500 may also include a number of external or internal devices such as input or output devices. For example, the computing device 500 is illustrated with an input/output interface 508 that can receive input from input devices or provide output to output devices. A bus 506 can also be included in the computing device 500. The bus 506 can communicatively couple one or more components of the computing device 500.

The computing device 500 can execute program code 514 that can include the temporal identity graph model 112. The program code 514 for the temporal identity graph model 112 may be resident in any suitable computer-readable medium and may be executed on any suitable processing device. For example, as depicted in FIG. 5, the program code 514 for the temporal identity graph model 112 can reside in the memory 504 at the computing device 500 along with the program data 516 associated with the program code 514, such as the historical data 124. Executing the temporal identity graph model 112 can configure the processor 502 to perform at least some of the operations described herein.

In some aspects, the computing device 500 can include one or more output devices. One example of an output device can be the network interface device 510 depicted in FIG. 5. A network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include the presentation device 512 depicted in FIG. 5. A presentation device 512 can include any device or group of devices suitable for providing visual, auditory, or other suitable sensory output. Non-limiting examples of the presentation device 512 can include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:
a processor; and
a non-transitory computer-readable medium comprising instructions that are executable by the processor to cause the processor to perform operations comprising:
receiving a request to visualize data relating to an entity and interactions associated with the entity;
receiving entity data that indicates an identity of the entity and a set of interactions associated with the entity;
generating a temporal identity graph using the entity data, the temporal identity graph temporally linking the identity of the entity with the set of interactions associated with the entity; and
generating a graphical user interface configured to provide the temporal identity graph in response to the request to visualize data relating to the entity and the interactions associated with the entity, the graphical user interface comprising a plurality of interactive elements representing the temporal identity graph, each interactive element of the plurality of interactive elements selectable by a user of the graphical user interface to display previously non-displayed information about a corresponding identity data point of the entity or previously non-displayed information about a corresponding interaction associated with the entity, wherein the operation of generating the temporal identity graph comprises arranging a plurality of nodes vertically offset from one another on a vertical axis that represents time, wherein each point along the vertical axis represents a different point in time compared to a point in time associated with another point along the vertical axis, and wherein each point along the vertical axis is configured to accept more than one node of the plurality of nodes, the more than one node corresponding to interactions having a common point in time.

2. The system of claim 1, wherein the operation of receiving the request comprises receiving a request from a particular entity to access an interactive computing environment, and wherein the operations further comprise providing a responsive message based on the temporal identity graph, the responsive message usable to control access to the interactive computing environment.

3. The system of claim 2, wherein the operations further comprise:
performing an analysis on the temporal identity graph to determine whether the particular entity is the entity associated with the visualized data; and
controlling an interaction involving the particular entity based on the analysis.

4. The system of claim 1, wherein the operation of generating the temporal identity graph comprises:
generating a first plurality of nodes representing the identity of the entity; and
generating a second plurality of nodes representing the set of interactions associated with the entity, wherein the plurality of nodes is the second plurality of nodes, and wherein the first plurality of nodes and the second plurality of nodes are included in the plurality of interactive elements.

5. The system of claim 4, wherein the operation of generating the temporal identity graph further comprises generating a plurality of connections, wherein each connection of the plurality of connections is configured to visually link a respective node of the first plurality of nodes to a corresponding node of the second plurality of nodes.

6. The system of claim 5, wherein the operation of generating the temporal identity graph comprises arranging the first plurality of nodes vertically with respect to a temporally first corresponding node of the second plurality of nodes and horizontally with respect to other nodes of the first plurality of nodes, wherein the other nodes of the first plurality of nodes correspond to the identity of the entity.

7. The system of claim 6, wherein each node of the second plurality of nodes is color-coded based on a type of interaction of the node.

8. A method comprising:
receiving, by a computing device, a request to visualize data relating to an entity and interactions associated with the entity;
receiving, by the computing device, entity data that indicates an identity of the entity and a set of interactions associated with the entity;
generating, by the computing device, a temporal identity graph using the entity data, the temporal identity graph temporally linking the identity of the entity with the set of interactions associated with the entity; and
generating, by the computing device, a graphical user interface configured to provide the temporal identity graph in response to the request to visualize data relating to the entity and the interactions associated with the entity, the graphical user interface comprising a plurality of interactive elements representing the temporal identity graph, each interactive element of the plurality of interactive elements selectable by a user of the graphical user interface to display previously non-displayed information about a corresponding identity data point of the entity or previously non-displayed information about a corresponding interaction associated with the entity, wherein generating the temporal identity graph comprises arranging a plurality of nodes vertically offset from one another on a vertical axis that represents time, wherein each point along the vertical axis represents a different point in time compared to a point in time associated with another point along the vertical axis, and wherein each point along the vertical axis is configured to accept more than one node of the plurality of nodes, the more than one node corresponding to interactions having a common point in time.

9. The method of claim 8, wherein receiving the request comprises receiving a request from a particular entity to access an interactive computing environment, and wherein the method further comprises providing a responsive message based on the temporal identity graph, the responsive message usable to control access to the interactive computing environment.

10. The method of claim 9, further comprising:
performing, by the computing device, an analysis on the temporal identity graph to determine whether the particular entity is the entity associated with the visualized data; and
controlling, by the computing device, an interaction involving the particular entity based on the analysis.

11. The method of claim 8, wherein generating the temporal identity graph comprises:
generating a first plurality of nodes representing the identity of the entity; and
generating a second plurality of nodes representing the set of interactions associated with the entity, wherein the second plurality of nodes is the plurality of nodes, and wherein the first plurality of nodes and the second plurality of nodes are included in the plurality of interactive elements.

12. The method of claim 11, wherein generating the temporal identity graph further comprises generating a plurality of connections, wherein each connection of the plurality of connections visually links a respective node of the first plurality of nodes to a corresponding node of the second plurality of nodes.

13. The method of claim 12, wherein generating the temporal identity graph comprises arranging the first plurality of nodes vertically with respect to a temporally first corresponding node of the second plurality of nodes and horizontally with respect to other nodes of the first plurality of nodes, wherein the other nodes of the first plurality of nodes correspond to the identity of the entity.

14. The method of claim 13, wherein each node of the second plurality of nodes is color-coded based on a type of interaction of the node.

15. A non-transitory computer-readable medium comprising instructions that are executable by a processing device for causing the processing device to perform operations comprising:
receiving a request to visualize data relating to an entity and interactions associated with the entity;
receiving entity data that indicates an identity of the entity and a set of interactions associated with the entity;
generating a temporal identity graph using the entity data, the temporal identity graph temporally linking the identity of the entity with the set of interactions associated with the entity; and
generating a graphical user interface configured to provide the temporal identity graph in response to the request to visualize data relating to the entity and the interactions associated with the entity, the graphical user interface comprising a plurality of interactive elements representing the temporal identity graph, each interactive element of the plurality of interactive elements selectable by a user of the graphical user interface to display previously non-displayed information about a corresponding identity data point of the entity or previously non-displayed information about a corresponding interaction associated with the entity, wherein the operation of generating the temporal identity graph comprises arranging a plurality of nodes vertically offset from one another on a vertical axis that represents time, wherein each point along the vertical axis represents a different point in time compared to a point in time associated with another point along the vertical axis, and wherein each point along the vertical axis is configured to accept more than one node of the plurality of nodes, the more than one node corresponding to interactions having a common point in time.

16. The non-transitory computer-readable medium of claim 15, wherein the operation of receiving the request comprises receiving a request from a particular entity to access an interactive computing environment, and wherein the operations further comprise providing a responsive message based on the temporal identity graph, the responsive message usable to control access to the interactive computing environment.

17. The non-transitory computer-readable medium of claim 16, wherein the operations further comprise:
performing an analysis on the temporal identity graph to determine whether the particular entity is the entity associated with the visualized data; and
controlling an interaction involving the particular entity based on the analysis.

18. The non-transitory computer-readable medium of claim 15, wherein the operation of generating the temporal identity graph comprises:
generating a first plurality of nodes representing the identity of the entity;
generating a second plurality of nodes representing the set of interactions associated with the entity, wherein the second plurality of nodes is the plurality of nodes, and wherein the first plurality of nodes and the second plurality of nodes are included in the plurality of interactive elements; and
generating a plurality of connections, wherein each connection of the plurality of connections is configured to visually link a respective node of the first plurality of nodes to a corresponding node of the second plurality of nodes.

19. The non-transitory computer-readable medium of claim 18, wherein the operation of generating the temporal identity graph comprises arranging the first plurality of nodes vertically with respect to a temporally first corresponding node of the second plurality of nodes and horizontally with respect to other nodes of the first plurality of nodes, wherein the other nodes of the first plurality of nodes correspond to the identity of the entity.

20. The non-transitory computer-readable medium of claim 19, wherein each node of the second plurality of nodes is color-coded based on a type of interaction of the node.

* * * * *